(No Model.)
F. WOLFE.
ANIMAL TRAP.
No. 332,175. Patented Dec. 8, 1885.
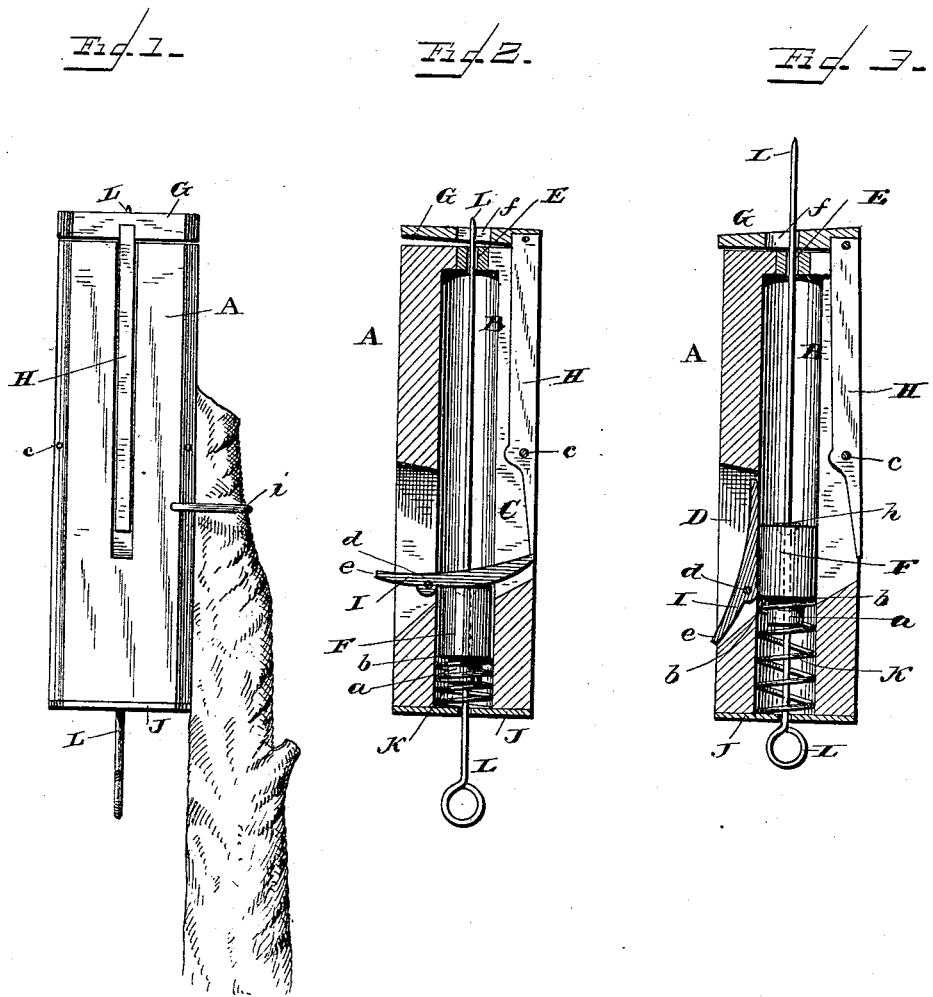
WITNESSES
F. L. Orrand
John T. Suter.
INVENTOR
Ferdinand Wolfe
per Edw. W. Donnet
Attorney

UNITED STATES PATENT OFFICE.

FERDINAND WOLFE, OF BAUFF, MISSOURI.

ANIMAL-TRAP.

SPECIFICATION forming part of Letters Patent No. 332,175, dated December 8, 1885.

Application filed July 29, 1885. Serial No. 172,974. (No model.)

*To all whom it may concern:*

Be it known that I, FERDINAND WOLFE, a citizen of the United States, residing at Bauff, in the county of Taney and State of Missouri, have invented certain new and useful Improvements in Animal-Traps; and I do hereby declare the following to be a full, clear, and exact description, of the invention, such as will enable others skilled in the art to which it appertains to make and use the same.

My invention is an improvement in animal-traps; and it relates more particularly to that class of traps which are intended to destroy crows, hawks, and other animals of the feathered kind, and such small quadrupeds as prey upon products of the farmer.

My invention is adapted for placement upon a pole, which may be secured in an upright position in a field of grain or vegetables; or it may be attached to some conspicuous upright portion of an old tree in an unsuspicious manner, a to offer convenient resting-place to the unwary bird or animal which has designs upon the farmer's crop. The housing of the trap is formed of a solid piece of material, preferably wood, which is provided with proper cavities formed by boring and slotting, to accommodate the metallic portions which form the active features of the device. A sharp steel stiletto or rod runs more than the entire length of the block, and when not in use projects with its sharpened end through the block which forms the housing, and also a detached piece, forming the foot-rest, which surrounds it. About said rod, near its lower end, is coiled a spiral spring, which is confined by a metallic plate attached to the lower end of the housing-block and the annular shoulder of a solid cylindrical core through which the stiletto passes. On one end of the block which forms the housing of the trap is a long pivoted latch, which connects with the detached foot-rest, and on the opposite side of said block is a pivoted catch, which moves in a suitable slot, and may be made to engage the lower end of said latch and hold it to position, and at the same time hold the stiletto and the core which surrounds it back upon the confined spiral spring. The spring, when released by the weight of the animal upon the rest, drives the stiletto into the victim sufficiently to deprive it of its life.

In my drawings, which form a part of this specification, Figure 1 is an elevation of the trap as applied to a pole. Fig. 2 is a longitudinal section of the trap, showing it set. Fig. 3 is a similar section showing the trap sprung.

Similar reference-letters indicate like parts in all the figures.

Referring to the drawings, A is the housing, which may be formed of wood bored out and slotted or of metal cast complete, having a cylindrical cavity, B, and slots C D. An opening, E, is formed in the top of the housing for the stiletto to pass through.

F is a cylindrical core of a diameter just sufficient to give a loose fit in the cylindrical cavity B, cut away to form a neck, $a$, and a shoulder, $b$.

G is the rest, which forms a footing for the animal, to which is secured the latch H, pivoted in the housing at $c$. Said rest is provided with a slot, $f$, which allows to it a free movement about the stiletto's sharpened end. The latch H is provided with a tongue at its lower end, which, when the trap is set, is engaged by a catch, I, pivoted in the housing A. The catch I has an arm, $e$, which projects outside of the housing to serve as a hold for the fingers to assist in setting the trap. Secured to the housing at its lower end is a plate, J, which has an opening for the stiletto to pass through and move vertically in. A coiled spring, K, encircles the neck of the core F, and it is confined in its action between the shoulder $b$ and the plate J.

L is the stiletto, which is sufficiently long to pass entirely through the housing longitudinally and extend above the same, terminating in a sharpened or barbed end, and below terminating outside of the said housing in a loop or knob for the hand to take hold of. This stiletto has fixed to it a button, which forms a shoulder, $h$, and which normally rests against the upper end of the core F, impinging closely upon the said core to carry it down while the trap is being and remains set.

The rest G may be of any suitable size or form best suited for a disguise and that will not interfere with its proper movement.

In setting the trap one hand of a person takes hold of the housing A and the other grasps the loop or knob of the stiletto L and draws the latter steadily down to its limit, while one of the fingers takes hold of the part $e$ of the catch I to throw the tongue of the said catch inward toward the latch H. When the said catch comes in contact with the shoulder $h$ of the stiletto, the core F acts, by its shoulder $b$, upon the spiral spring K, which yields until the end of said catch reaches the latch H. The said latch H is first thrown out, and then drops in when the trap is so leaned over as that the rest G may gravitate outward, and then engages the catch I, the said latch and catch being held in locked position by force of the spring K, between the shoulder $h$ and the extreme lower end of the said latch H.

When the trap is set, the stiletto-point is concealed below the upper surface of the rest G. When the animal—say a crow—lights upon the rest G, his weight carries the lower end of the latch outward and instantly releases the catch, allowing the force of the spring K to drive the stiletto deep into the vitals of the animal before it can recover itself for flight. The housing has pivoted to it a bail, $i$, to serve as a hold for the pole when the trap is in use and as a handle by which said trap may be rendered easily portable.

I am aware that animal-traps have been invented and patented provided with stilettos or forks that may be forced into their victims by springs which are held back and released through the agency of pivoted latches and catches; and to such, broadly, I make no claim.

Having thus described my invention, what I claim as new, and desire to secure by Letters Patent, is—

1. In an animal-trap, the combination, with the stiletto provided with the shoulder $h$, core F, and spring K, of the housing A, arranged and formed in the manner described, to conceal the said stiletto, rest G, and pivoted latch H, united as one, and pivoted catch I, as and for the purpose set forth.

2. The combination, with the operating parts of the trap, consisting of the combined rest G and latch H, catch I and spring K, and housing A, of the bail or hold $i$, as and for the purpose set forth.

In testimony whereof I affix my signature in presence of two witnesses.

FERDINAND WOLFE.

Witnesses:
J. W. OWEN,
A. M. OWEN.